(No Model.)
J. H. CLARKE.
SYRINGE.
No. 291,690. Patented Jan. 8, 1884.
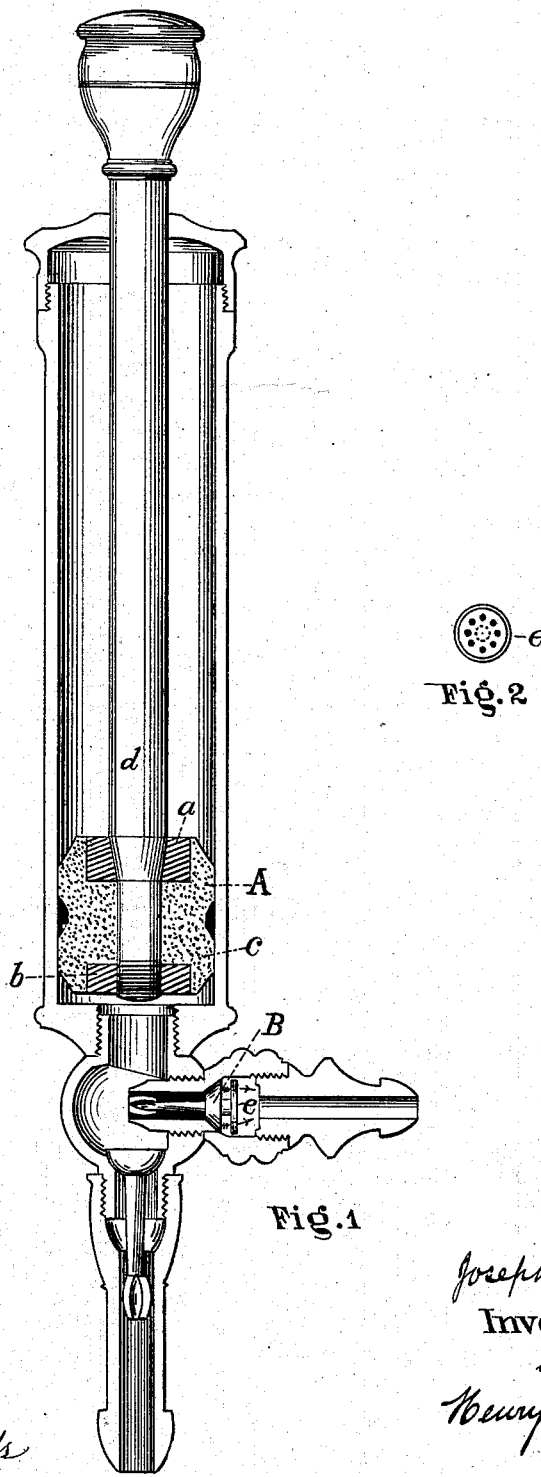

UNITED STATES PATENT OFFICE.

JOSEPH H. CLARKE, OF SPRINGFIELD, OHIO.

SYRINGE.

SPECIFICATION forming part of Letters Patent No. 291,690, dated January 8, 1884.

Application filed July 2, 1883. (No model.)

*To all whom it may concern:*

Be it known that I, JOSEPH H. CLARKE, of Springfield, county of Clarke, State of Ohio, have invented a new and useful Improvement in Syringes, of which the following is a specification.

In the accompanying drawings, Figure 1 is a vertical section of a syringe embodying my improvements, and Fig. 2 is a plan view of the top of the egress-valve.

The invention consists in the construction and arrangement of parts, hereinafter fully specified, and pointed out in claims.

The syringe in its general construction is not new with me, but the construction of the piston and egress valve I believe to be of my invention. I shall therefore confine myself to a description of them, together with such other description, as is necessary to enable others skilled in the art to make and use my invention.

In the first place, the piston A is made of the three pieces $a\ b\ c$, and it is held together by a piston-rod, $d$, which may be of any construction, provided it is suitably shouldered and threaded at its lower extremity. The part $c$ is of common rubber, and of the configuration shown in the drawings—that is having its upper and lower edges beveled and its sides recessed, which permits it to expand or contract to suit the diameter of the cylinder in which it operates. To cause the piston to expand to fit the cylinder the nut $b$, which is cylindrical and of vulcanized rubber, is drawn toward the washer $a$, which is also cylindrical and of the same material as the nut. By turning the piston-rod $d$ in one direction the piston can be expanded, and by turning it in the opposite direction it can be contracted. Besides, with this construction, this object can be accomplished very readily, and in some instances without the removal of the piston from the cylinder.

The egress-valve B is of the customary construction, except as to the part $e$, which forms a part of it. The part $e$ projects beyond the top of the usual valve, in the manner shown in Fig. 1 of the drawings, and its diameter is slightly less than that of the valve-chamber in which it works. It is also perforated, as indicated by arrows in Fig. 1, and shown by plan view in Fig. 2. These perforations and the arrangement of the valve are for the purpose of screening the fluid as it passes through the valve, and thus arrest foreign matter that may otherwise pass through, and, for example, obstruct the passage of fluid into the arteries of a body undergoing an embalming process.

Having thus described my invention, what I claim as new, and desire to secure by Letters Patent, is—

1. In a syringe, a valve therefor provided with a projecting perforated part, $e$, to serve as a filter, substantially as described.

2. In a syringe, a piston for the cylinder thereof, composed of the elastic portion $c$, having its upper and lower edges beveled and its sides recessed, in combination with the washer $a$ and nut $b$, set into opposite faces of the portion $c$, and the threaded and shouldered rod $d$, passed through the three parts, substantially as described.

In testimony whereof I have hereunto set my hand this 19th day of May, 1883.

JOSEPH H. CLARKE.

Witnesses:
HENRY MILLWARD,
E. S. WALLACE.